(12) United States Patent
Utsumi et al.

(10) Patent No.: US 8,320,631 B2
(45) Date of Patent: Nov. 27, 2012

(54) MOVEMENT DETECTION APPARATUS AND MOVEMENT DETECTION METHOD

(75) Inventors: Toshiaki Utsumi, Akishima (JP); Tetsuo Sakurai, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 166 days.

(21) Appl. No.: 12/964,370

(22) Filed: Dec. 9, 2010

(65) Prior Publication Data

US 2011/0293147 A1    Dec. 1, 2011

(30) Foreign Application Priority Data

May 31, 2010   (JP) ................................. 2010-125295

(51) Int. Cl.
*G06K 9/00*   (2006.01)
*H04N 11/02*  (2006.01)
(52) U.S. Cl. ..................... 382/107; 382/291; 375/240.29
(58) Field of Classification Search .................. 382/100, 382/103, 106–107, 162, 168, 173, 181, 199, 382/232, 254–260, 274–276, 282, 291, 305, 382/312, 284; 250/208.1; 348/302; 375/240.29
See application file for complete search history.

(56) References Cited

U.S. PATENT DOCUMENTS

| 6,563,540 B2 * | 5/2003 | Trevino et al. ................ 348/302 |
| 6,858,827 B2 * | 2/2005 | Sugiyama et al. .......... 250/208.1 |
| 7,835,590 B2 * | 11/2010 | Itoh et al. ....................... 382/284 |
| 7,885,341 B2 * | 2/2011 | Chen et al. ................ 375/240.29 |
| 8,189,964 B2 * | 5/2012 | Flynn et al. .................... 382/305 |

FOREIGN PATENT DOCUMENTS

| JP | 06-121194 | 4/1994 |
| JP | 09187008 | 7/1997 |
| JP | 2008-258848 | * 10/2008 |
| JP | 2008278785 | 11/2008 |
| JP | 2009189440 | 8/2009 |

OTHER PUBLICATIONS

Japanese Patent Application No. 2010-125295; Notice of Reasons for Rejection; Mailed Jul. 19, 2011 (English translation).
Japanese Patent Application No. 2010-125295; Notice of Reasons for Rejection; Mailed Mar. 1, 2011 (English translation).

* cited by examiner

*Primary Examiner* — Seyed Azarian
(74) *Attorney, Agent, or Firm* — Blakely, Sokoloff, Taylor & Zafman LLP

(57) ABSTRACT

According to one embodiment, a movement detection apparatus includes an arithmetic module, an edge-storing filter, a determination module, and a control module. The arithmetic module calculates a difference signal between an input image signal and an image signal of the previous frame. The filter performs smoothing processing for a signal falling within a level range provided as threshold value, among difference signals calculated by the arithmetic module. The determination module determines levels of a movement component and a noise component of the signal output from the filter. The control module controls a level range supplied as threshold value to the filter in accordance with an amplitude level of the noise component overlying the input image signal.

9 Claims, 9 Drawing Sheets

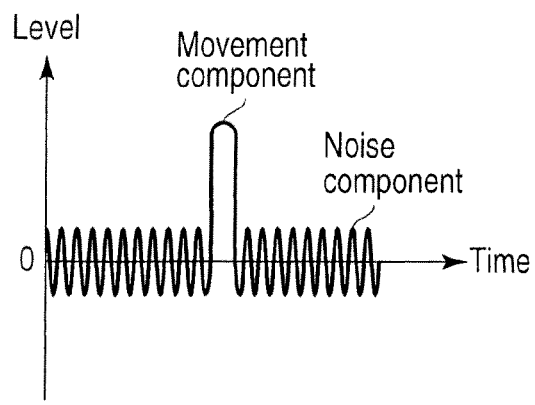
F I G. 3 A
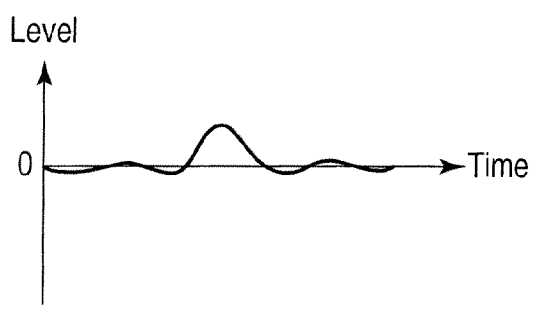
F I G. 3 B
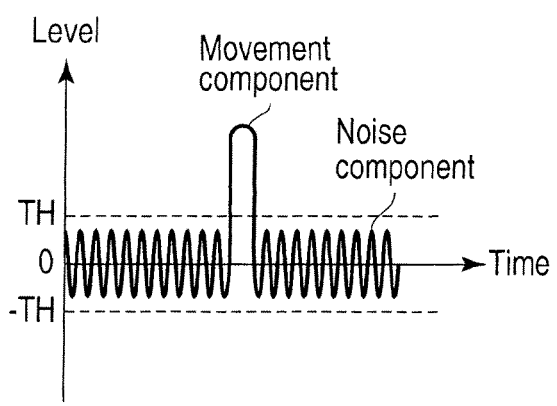
F I G. 4 A
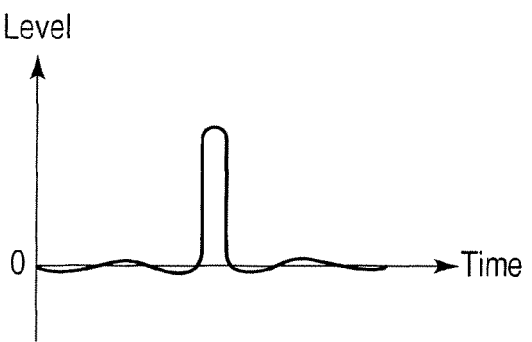
F I G. 4 B

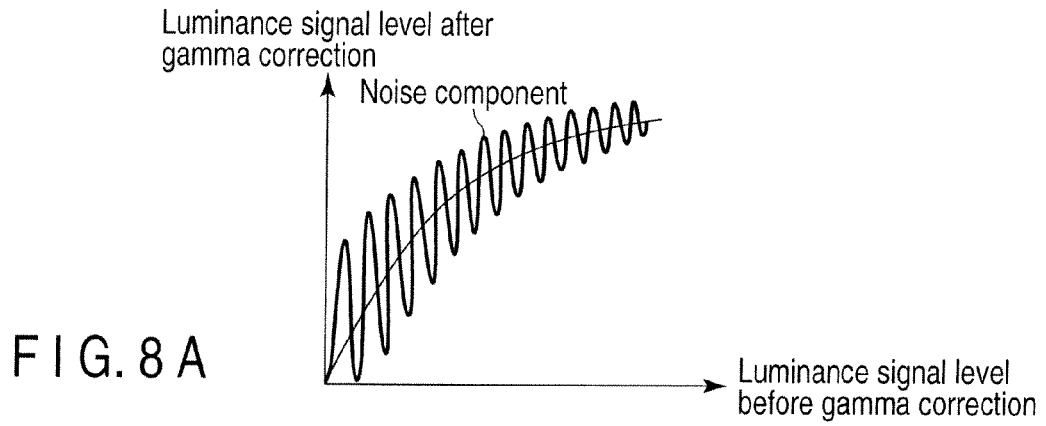
F I G. 8 A
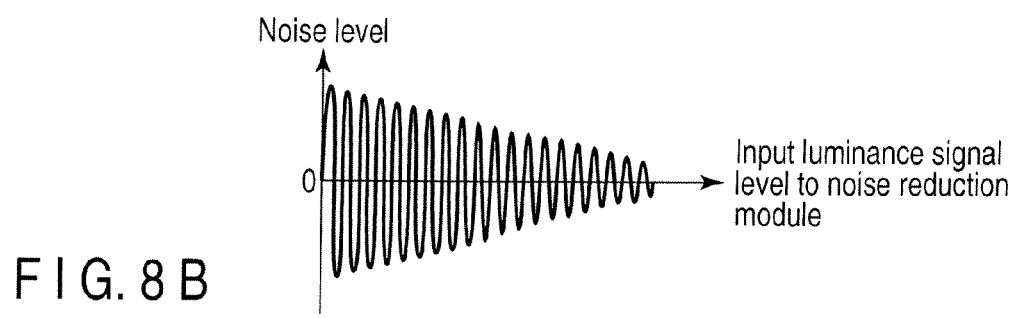
F I G. 8 B
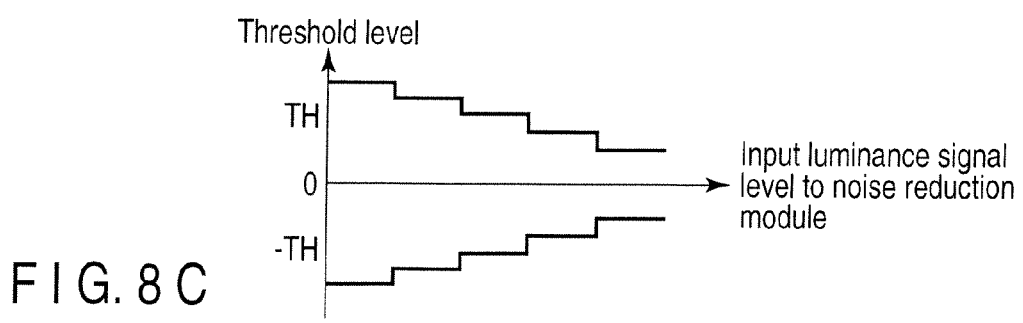
F I G. 8 C

| Gain | Gamma correction coefficient | Input luminance signal level | Threshold value |
|---|---|---|---|
| A dB | a | $0 \leq Yin \leq 100$ | THa1 |
| | | $100 < Yin \leq 200$ | THa2 |
| | | ⋮ | ⋮ |
| | b | $0 \leq Yin \leq 100$ | THb1 |
| | | $100 < Yin \leq 200$ | THb2 |
| | | ⋮ | ⋮ |
| | c | $0 \leq Yin \leq 100$ | THc1 |
| | | $100 < Yin \leq 200$ | THc2 |
| | | ⋮ | ⋮ |
| | ⋮ | | |

F I G. 9

MOVEMENT DETECTION APPARATUS AND MOVEMENT DETECTION METHOD

CROSS-REFERENCE TO RELATED APPLICATIONS

This application is based upon and claims the benefit of priority from Japanese Patent Application No. 2010-125295, filed May 31, 2010; the entire contents of which are incorporated herein by reference.

FIELD

Embodiments described herein relate generally to a movement detection apparatus and a movement detection method, which detect a movement component from an image signal.

BACKGROUND

As is well known, in imaging apparatuses which can obtain moving images such as digital cameras, it is performed to execute noise reduction processing for an image signal of a frame obtained by imaging a subject, and thereby reduce a noise component of the image signal and improve the signal-to-noise ratio (SNR) thereof.

In recent years, a cyclic noise reduction technique has been widespread as one of such noise reduction processing. This is a technique in which a difference between an input image signal forming a frame and an image signal forming the previous frame is multiplied by a cyclic coefficient (KNR), a multiplication result is added to the input image signal, and thereby the SNR is improved.

In the meantime, in the cyclic noise reduction technique, it is known that persistence of vision increases as the cyclic coefficient increases, while the noise reduction effect is increased as the cyclic coefficient increases. Therefore, in the present circumstances, a movement component and a noise component are determined from a difference between image signals forming the former and the latter successive frames, persistence of vision is suppressed by reducing the value of the cyclic coefficient in a part including the movement component, and noise reduction effect is increased by increasing the value of the cyclic coefficient in a part including the noise component.

In the meantime, the processing technique of determining a movement component and a noise component from a difference between image signals forming the former and the latter successive frames as described above is still at a stage of being developed, and must be regarded as having low reliability in determination result. The above technique has much room for improvement in various points to further improve the determination accuracy and for practical use.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 3A and FIG. 3B are diagrams for illustrating a method of determining a movement component and a noise component from image signals in the present circumstances.

FIG. 4A and FIG. 4B are diagrams for illustrating an example of a method of determining a movement component and a noise component from image signals by the cyclic noise reduction module in the embodiment.

FIG. 8A, FIG. 8B and FIG. 8C are diagrams for illustrating another example of main processing operation performed by the cyclic noise reduction module in the embodiment.

FIG. 9 is a diagram for illustrating an example of a table which the cyclic noise reduction module has in the embodiment.

DETAILED DESCRIPTION

Various embodiments will be described hereinafter with reference to the accompanying drawings. In general, according to one embodiment, a movement detection apparatus comprises an arithmetic module, an edge-storing filter, a determination module, and a control module. The arithmetic module calculates a difference signal between an input image signal and an image signal of the previous frame. The filter performs smoothing processing for a signal falling within a level range provided as threshold value, among difference signals calculated by the arithmetic module. The determination module determines levels of a movement component and a noise component of the signal output from the filter. The control module controls a level range supplied as threshold value to the filter in accordance with an amplitude level of the noise component overlying the input image signal.

Figure 1:
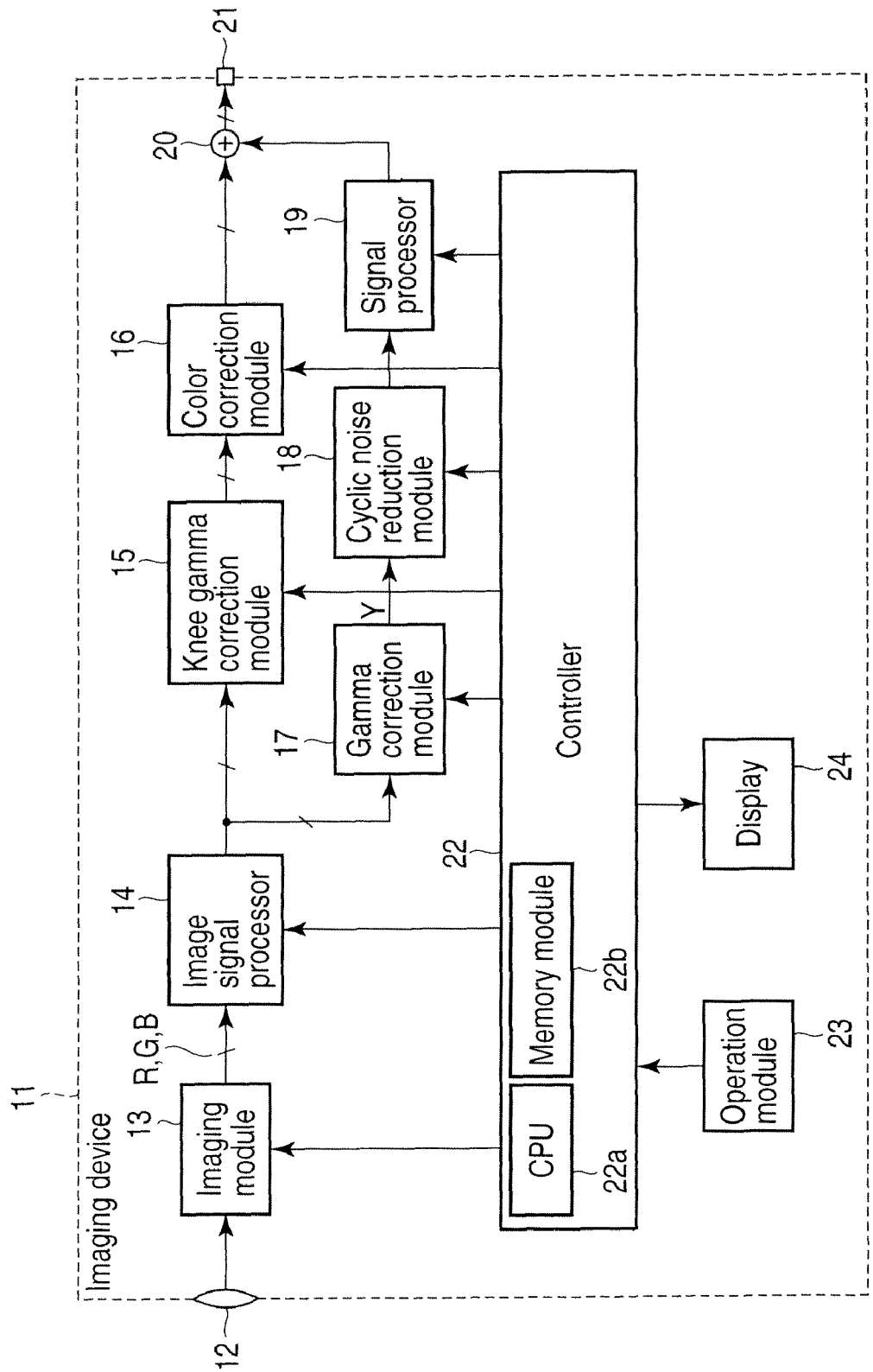
FIG. 1 is a block diagram for schematically illustrating an example of a signal processing system of an imaging device according to an embodiment.

FIG. 1 schematically illustrates a signal processing system of an imaging device 11 explained in the present embodiment. Specifically, an optical image of a subject which is made incident through an imaging lens 12 is supplied to an imaging module 13, and converted into color signals for red (R), green (G), and blue (B).

As the imaging module 13, used is a three-panel imaging module which separates incident light from the imaging lens 12 into color components of R, G and B by color filters, and forms images of light beams of the separated three color components on the imaging device to generate color signals R, G and B, or a single-panel imaging module which generates color signals R, G and B by using a imaging device being a single panel.

Then, the color signals R, G and B output from the imaging module 13 are supplied to an image signal processor 14 and converted into digital signals, and thereafter subjected to white balance control processing and gain control processing by automatic gain control (AGC).

In addition, the color signals R, G and B output from the image signal processor 14 are supplied to a knee gamma correction module 15, and subjected to knee correction processing, which performs level compression for a high-luminance component, and gamma correction processing. In addition, the color signals R, G and B output from the knee gamma correction module 15 are supplied to a color correction module 16, and subjected to color correction processing.

On the other hand, the color signals R, G and B output from the image signal processor 14 are supplied to a gamma correction module 17 and converted into a luminance signal Y, and subjected to gamma correction processing. Thereafter, the luminance signal Y output from the gamma correction module 17 is supplied to a cyclic noise reduction module 18 and subjected to noise reduction processing, and then subjected to predetermined digital signal processing such as outline emphasis by a signal processor 19.

Then, the color signals R, G and B output from the color correction module 16 are supplied to an addition circuit 20, in which the luminance signal Y output from the signal processor 19 is added to the color signals, and then output from an output terminal 21.

All the operations of the imaging device 11, including the above imaging operation, are controlled by a controller 22. The controller 22 includes a central processing unit (CPU) 22a, and controls the modules in the imaging device 11, in receipt of operation information from an operation module 23 installed in the main body of the imaging device 11, to reflect the operation content.

In this example, the controller 22 uses a memory module 22b. The memory module 22b mainly includes a read-only memory (ROM) which stores a control program to be executed by the CPU 22a, a random access memory (RAM) to provide the CPU 22a with a work area, and a nonvolatile memory which stores various setting information and control information.

In addition, the controller 22 is connected with a display 24. The display 24 displays obtained images, and displays operation circumstances of the imaging device 11 and states of the modules, based on operation of the operation module 23 by the user. Besides, the display 24 displays a menu picture including a plurality of items, based on operation of the operation module 23 by the user. The user operates the operation module 23 and selects a desired item from the menu picture, and thereby can set the imaging device 11 in a desired state.

Figure 2:
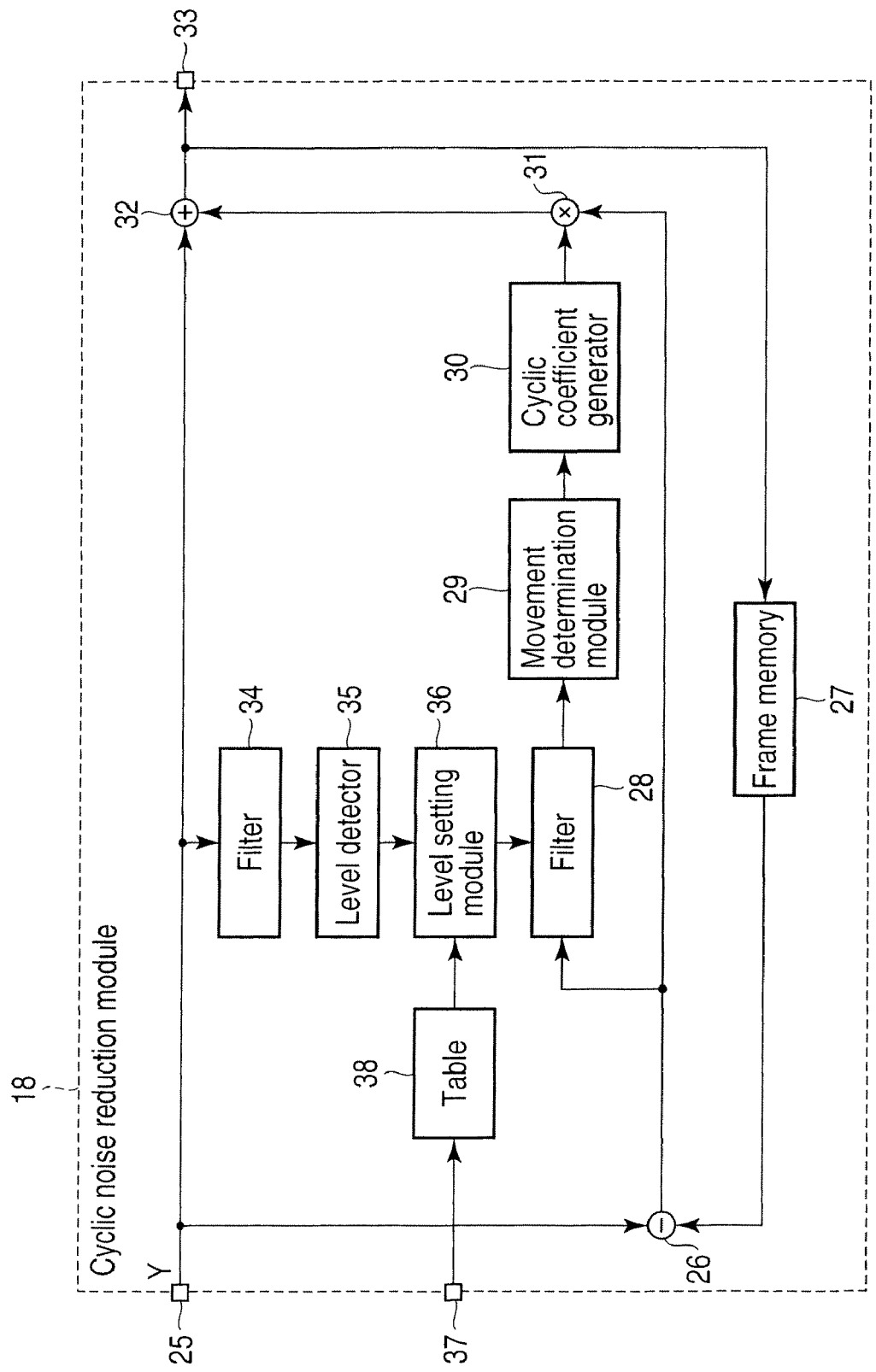
FIG. 2 is a block diagram for illustrating an example of a cyclic noise reduction module of the imaging device of the embodiment.

FIG. 2 illustrates an example of the cyclic noise reduction module 18. Specifically, the cyclic noise reduction module 18 includes an input terminal 25, to which the luminance signal Y output from the gamma correction module 17 is supplied. Then, the luminance signal Y supplied to the input terminal 25 is supplied to a subtraction circuit 26, and a luminance signal Y of the previous frame stored in a frame memory 27 is subtracted from the present luminance signal Y. Specifically, the subtraction circuit 26 calculates a difference between the luminance signals Y forming the former and the latter successive frames.

The difference calculated by the subtraction circuit 26 is smoothed by a filter 28, thereafter supplied to a movement determination module 29, and determined whether each component is a movement component or a noise component. Then, a result of the determination is supplied to a cyclic coefficient generator 30. Based on the determination result of the movement determination module 29, the cyclic coefficient generator 30 outputs a cyclic coefficient of small value in a part including movement, and outputs a cyclic coefficient of large value in a part including noise.

Then, the cyclic coefficient output from the cyclic coefficient generator 30 is multiplied by a multiplying circuit 31 by the difference calculated by the subtraction circuit 26. Thereafter, a result of the multiplication of the multiplying circuit 31 is added to the luminance signal Y supplied to the input terminal 25 by an addition circuit 32, and a result of the addition is stored in the frame memory 27 and output from an output terminal 33. Thereby, the luminance signal Y supplied to the input terminal 25 is subjected to noise reduction processing which suppresses persistence of vision in a part including movement and improves the noise reduction effect in a part including noise.

In the meantime, the difference signal calculated and output by the subtraction circuit 26 includes a noise component of low level and a movement component of high level, as illustrated in FIG. 3A. When the difference signal is smoothed by an ordinary filter (for example, a low-pass filter [LPF]) 28, the level of the movement component is also decreased together with the level of the noise component, as illustrated in FIG. 3B. This serves as a main cause of decrease in determination accuracy achieved when the following movement determination module 29 determines by level whether the component is a movement component or a noise component.

Therefore, in the present embodiment, an edge-storing filter such as an epsilon filter is used as the filter 28. The edge-storing filter 28 performs smoothing processing as filter for signals of levels falling within a predetermined level range (for example, a range of +TH to −TH with 0 serving as the center) provided as threshold value, and does not perform smoothing processing, that is, does not function as a filter for signals of levels exceeding the level range.

By using the edge-storing filter 28 like this, the filter 28 outputs a signal, in which the movement component is not smoothed and maintained at the current level and only the noise component is smoothed and reduced in level, as illustrated in FIG. 4B, by setting a level range (+TH to −TH) which includes the noise component and does not include the movement component, as threshold value, as illustrated in FIG. 4A. Specifically, since the difference in level between the movement component and the noise component is further increased as output of the filter 28, it is possible to improve the determination accuracy achieved when the following movement determination module 29 determines by level whether the component is a movement component or a noise component.

Figure 5A:
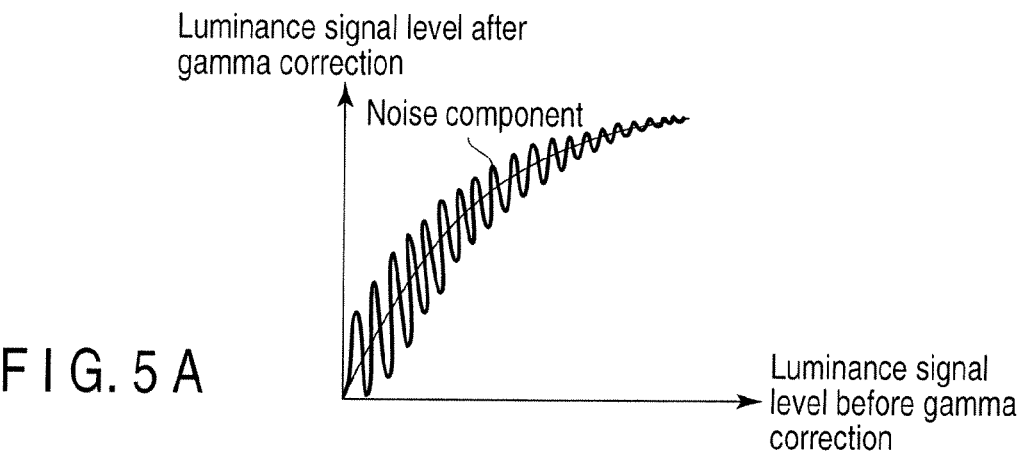
FIG. 5A, FIG. 5B, FIG. 5C, and FIG. 5D are diagrams for illustrating an example of main processing operation performed by the cyclic noise reduction module in the embodiment.

Next, explained is setting a level range with which the edge-storing filter 28 is provided as threshold value. FIG. 5A illustrates an example of an input and output characteristic in the gamma correction module 17. In FIG. 5A, the horizontal axis indicates the level of the luminance signal Y before the luminance signal Y is subjected to gamma correction processing in the gamma correction module 17, and the vertical axis indicates the level of the luminance signal Y after the luminance signal Y is subjected to gamma correction processing in the gamma correction module 17.

As illustrated in FIG. 5A, the luminance signal Y after gamma correction is overlaid with a noise component. The noise component has high amplitude level in a part where change in level of the luminance signal Y after gamma correction is large, in comparison with change in level of the luminance signal Y before gamma correction, that is, in a part where the level of the luminance signal Y before gamma correction is low (part where the level of the luminance signal Y after gamma correction is low). In addition, the noise component has low amplitude level in a part where change in level of the luminance signal Y after gamma correction is small, in comparison with change in level of the luminance signal Y before gamma correction, that is, in a part where the level of the luminance signal Y before gamma correction is high (part where the level of the luminance signal Y after gamma correction is high).

Figure 5B:
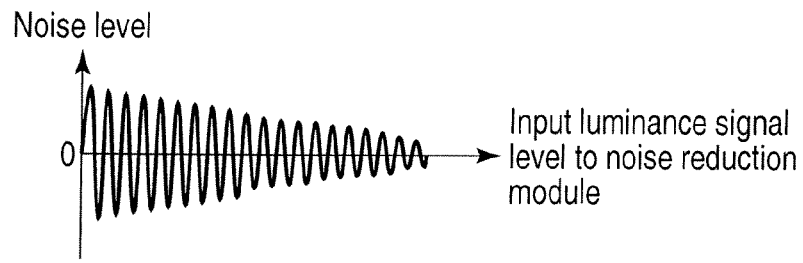

In short, the gamma-corrected luminance signal Y, that is, the luminance signal Y to be input to the cyclic noise reduction module 18 is overlaid with a noise component, which has a high amplitude level in a part where the luminance signal Y has low level, and the amplitude level of the noise component decreases as the level of the luminance signal Y increases, as illustrated in FIG. 5B.

Therefore, in the cyclic noise reduction module 18 illustrated in FIG. 2, the gamma-corrected luminance signal Y input to the input terminal 25 is supplied to a filter 34 to remove the noise component, and then a level detector 35 detects the level of the luminance signal Y and supplies a detection result to a level setting module 36. The level setting module 36 sets a level range corresponding to the level of the luminance signal Y detected by the level detector 35, and supplies the level range to the filter 28 as threshold value.

Figure 5C:
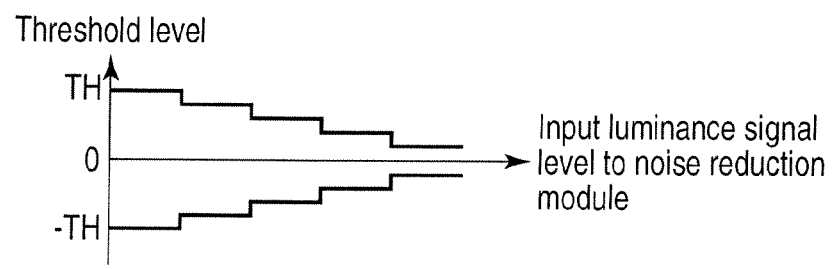

Specifically, the level setting module 36 provides the filter 28 with a level range (+TH to −TH) as illustrated in FIG. 5C as threshold value, which corresponds to a characteristic that the amplitude level of the noise component overlying the luminance signal Y input to the cyclic noise reduction module 18 decreases as the level of the input luminance signal Y increases as illustrated in FIG. 5B.

With respect to the luminance signal Y supplied to the input terminal 25, it is possible to know in advance at which level the luminance signal Y is overlaid with a noise component of what amplitude level, when it is possible to know the gamma correction coefficient which sets the input and output characteristic of the gamma correction module 17 and the gain which is set for AGC in the imaging signal processor 14. Therefore, the level setting module 36 can set a level range (+TH to −TH) corresponding to the amplitude level of the noise component overlying the luminance signal Y, in accordance with the level of the input luminance signal Y.

Specifically, the level range (+TH to −TH) supplied to the edge-storing filter 28 as threshold value is changed, in accordance with the amplitude level of the noise component which changes according to the level of the luminance signal Y. Therefore, in the output of the filter 28, difference in level between the movement component and the noise component is further increased. Thus, it is possible to improve the determination accuracy in level determination achieved when the following movement determination module 29 determines by level whether the component is a movement component or a noise component.

Figure 5D:
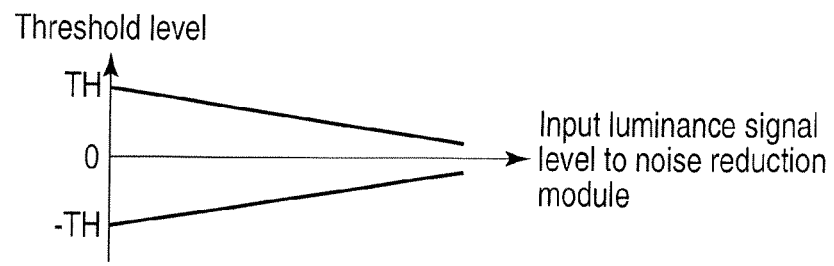

The level range (+TH to −TH) supplied to the filter 28 as threshold value can not only be gradually changed in accordance with the level of the luminance signal Y as illustrated in FIG. 5C, but also be changed to have a linear characteristic in accordance with the level of the luminance signal Y as illustrated in FIG. 5D.

Next, when the user operates the operation module 23 and sets a desired imaging mode, the input and output characteristic of the gamma correction module 17 and the gain by AGC are changed in accordance with the imaging mode. For example, with respect to the input and output characteristic of the gamma correction module 17, the input and output characteristic is changed to a characteristic as illustrated in FIG. 6A in which change in level of the luminance signal Y after gamma correction is further increased in a part where the level of the luminance signal Y before gamma correction is low, in comparison with the characteristic illustrated in FIG. 5A, or a characteristic as illustrated in FIG. 7A in which the level of the luminance signal Y after gamma correction is almost proportional to change in level of the luminance signal Y before gamma correction.

Figure 6A:
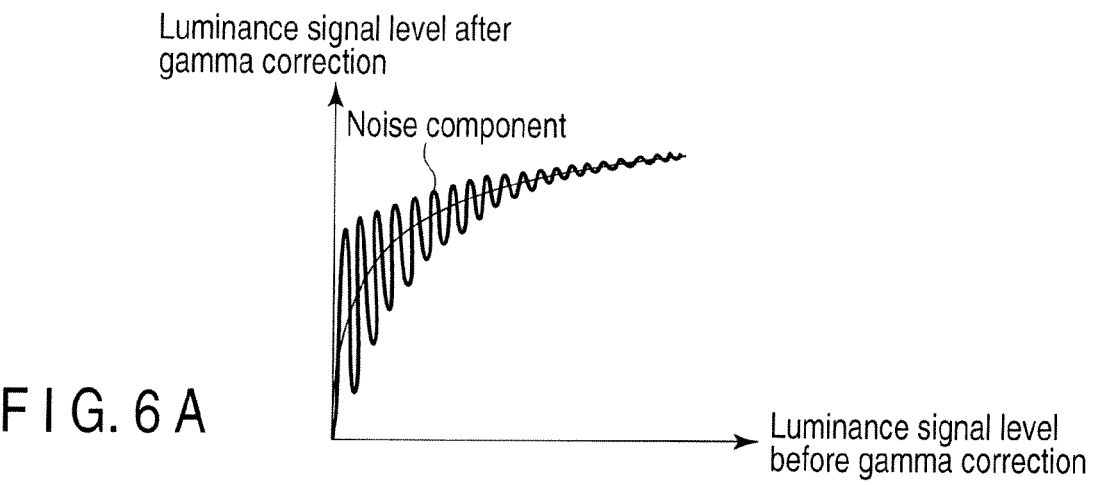
FIG. 6A, FIG. 6B, and FIG. 6C are diagrams for illustrating another example of main processing operation performed by the cyclic noise reduction module in the embodiment.
Figure 6B:
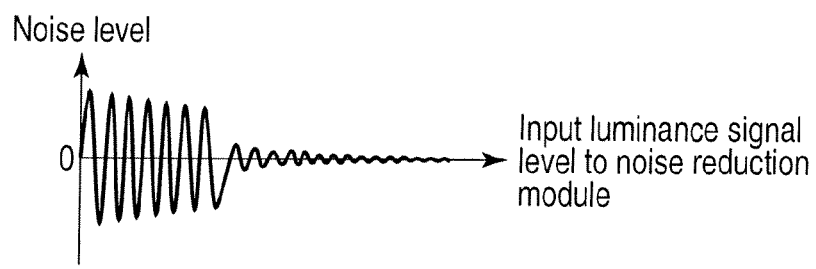

Among the characteristics, when the characteristic is set to the characteristics illustrated in FIG. 6A, the gamma-corrected luminance signal Y, that is, the luminance signal Y to be input to the cyclic noise reduction module 18 is overlaid with a noise component which has high amplitude level in a part where the luminance signal has low level, and has low amplitude level in a part where the luminance signal has a level higher than a predetermined level, as illustrated in FIG. 6B.

Figure 6C:
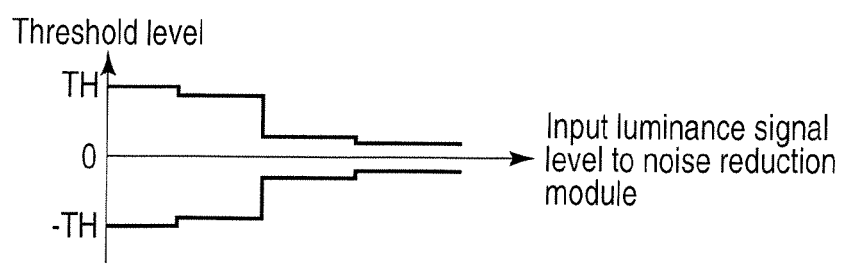

Therefore, it is necessary to provide the filter 28 with, as threshold value, a level range (+TH to −TH) as illustrated in FIG. 6C, which corresponds to a characteristic in which the amplitude level of the noise component overlying the luminance signal Y to be input to the cyclic noise reduction module 18 is high in a part where the level of the input luminance signal Y is low, and the amplitude level of the noise component is low in a part where the input luminance signal Y is high, as illustrated in FIG. 6B.

Figure 7A:
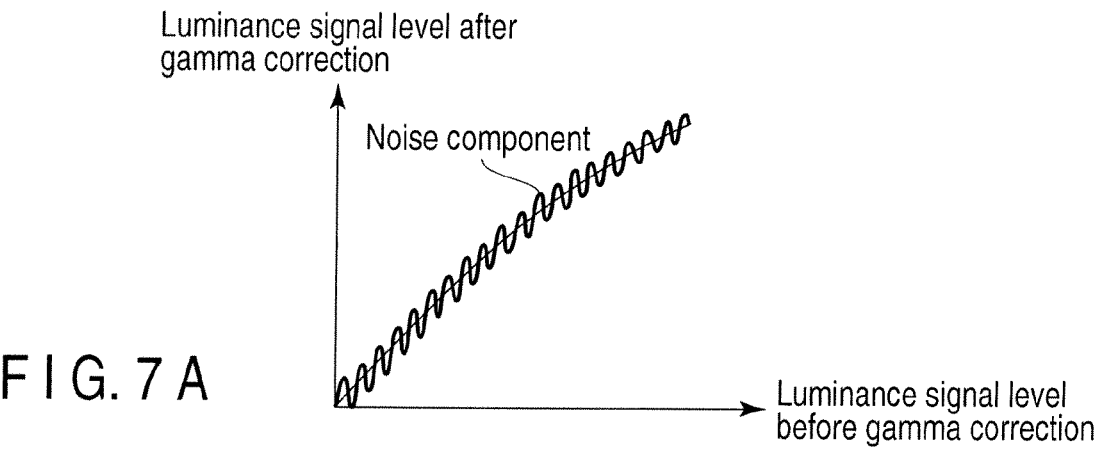
FIG. 7A, FIG. 7B and FIG. 7C are diagrams for illustrating another example of main processing operation performed by the cyclic noise reduction module in the embodiment.
Figure 7B:
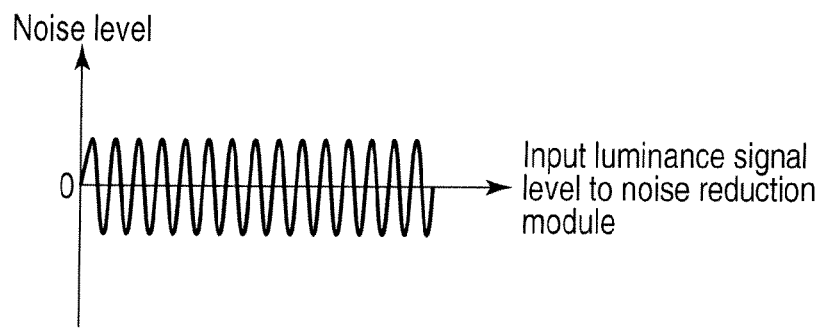

In addition, when the characteristic is set to the characteristics illustrated in FIG. 7A, the gamma-corrected luminance signal Y, that is, the luminance signal Y to be input to the cyclic noise reduction module 18 is overlaid with a noise component which has an almost fixed amplitude level through all the levels of the luminance signal Y, as illustrated in FIG. 7B.

Figure 7C:
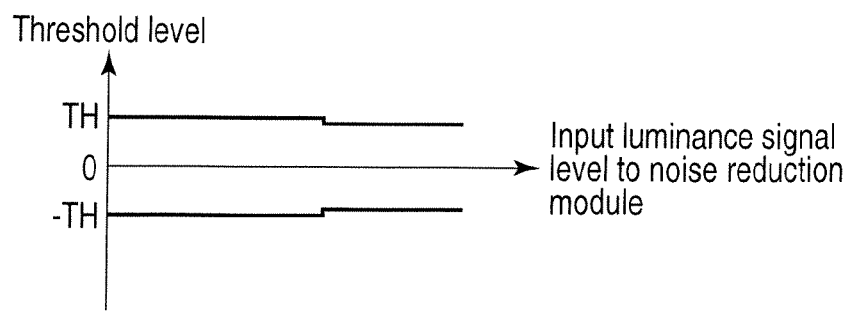

Therefore, it is necessary to provide the filter 28 with, as threshold value, a level range (+TH to −TH) as illustrated in FIG. 7C, which corresponds to a characteristic in which the noise component overlying the luminance signal Y to be input to the cyclic noise reduction module 18 has an almost fixed amplitude level through all the levels of the input luminance signal Y, as illustrated in FIG. 7B.

In addition, when the gain is increased by AGC, even when the input and output characteristic of the gamma correction module 17 is the same as the input and output characteristic illustrated in FIG. 5A above as illustrated in FIG. 8A, the amplitude level of the noise component overlying the luminance signal Y to be input to the cyclic noise reduction module 18 is amplified through the whole range of the input luminance signal Y as illustrated in FIG. 8B, while the noise component still has the same characteristic as illustrated in FIG. 5B, that is, the characteristic in which the amplitude level is high in a part where the level of the luminance signal Y is high and the amplitude level decreases as the level of the luminance signal Y increases.

Therefore, it is necessary to provide the filter 28, as threshold level, with a level range (+TH to −TH) as illustrated in FIG. 8C, which corresponds to a characteristic in which the amplitude level of the noise level overlying the luminance signal Y to be input to the cyclic noise reduction module 18 is amplified through the whole range of the input luminance signal Y, and decreases as the level of the input luminance signal Y increases, as illustrated in FIG. 8B.

Therefore, in the cyclic noise reduction module 18 illustrated in FIG. 2, when the user operates the operation module 23 and sets the imaging mode, various control information generated by the controller 22 is supplied to a table 38 through an input terminal 37. The control information includes, for example, a gamma correction coefficient to set the input and output characteristic of the gamma correction module 17, and the gain which is set for AGC performed in the imaging signal processor 14.

FIG. 9 illustrates an example of the above table 38. Specifically, in the table 38, a plurality of gamma correction coefficients a, b, c, . . . are prepared for a gain AdB which serves as standard of AGC. In addition, for each of the gamma correction coefficients a, b, c, . . . , the level Yin of the luminance signal Y detected by the level detector 35 is divided into a plurality of level ranges, and a level range serving as threshold value to be supplied to the filter 28 is set for each divided level range.

In addition, when the controller 22 sets the standard gain AdB as the gain for AGC and sets b as the gamma correction coefficient, the table 38 supplies the level setting module 36 with information of a region describing the level Yin of the luminance signal Y corresponding to the gamma correction coefficient b, and information of a region describing a level range serving as threshold value to be supplied to the filter 28 in correspondence with the region.

Therefore, the level setting module 36 provides the filter 28, as threshold value, with a level range corresponding to the level Yin of the luminance signal Y detected by the level detector 35, with reference to the information supplied from the table 38. For example, when the level Yin of the luminance signal Y detected by the level detector 35 falls within a range of $100 < Yin \leq 200$, a level range (THb2 to −THb2) is supplied to the filter 28 as threshold value.

Thereby, even when the input and output characteristic of the gamma correction module 17 and the gain by AGC are changed, the level setting module 36 can set a level range (+TH to −TH) which corresponds to the amplitude level of the noise component overlying the input luminance signal Y in the filter 28, in accordance with the level of the input luminance signal Y. Therefore, since the difference in level between the movement component and the noise component is further increased in the output of the filter 28, it is possible to improve the determination accuracy in level determination achieved when the following movement determination module 29 determines by level whether the component is a movement component or a noise component.

In addition, when the gain for AGC is changed from the standard gain AdB, the table 38 can deal with the change by calculating the change rate of the changed gain for the standard gain AdB, and multiplying the change rate by the threshold value level. Besides, it is possible to set the threshold value in accordance with more detailed conditions, by calculating various information items in the table 38.

The method of obtaining a threshold level to be supplied to the filter 28 is not limited to the above table 38. For example, it is also possible to use an arithmetic expression in which the gain, the gamma correction coefficient and the luminance signal level Yin are substituted.

Figure 10:
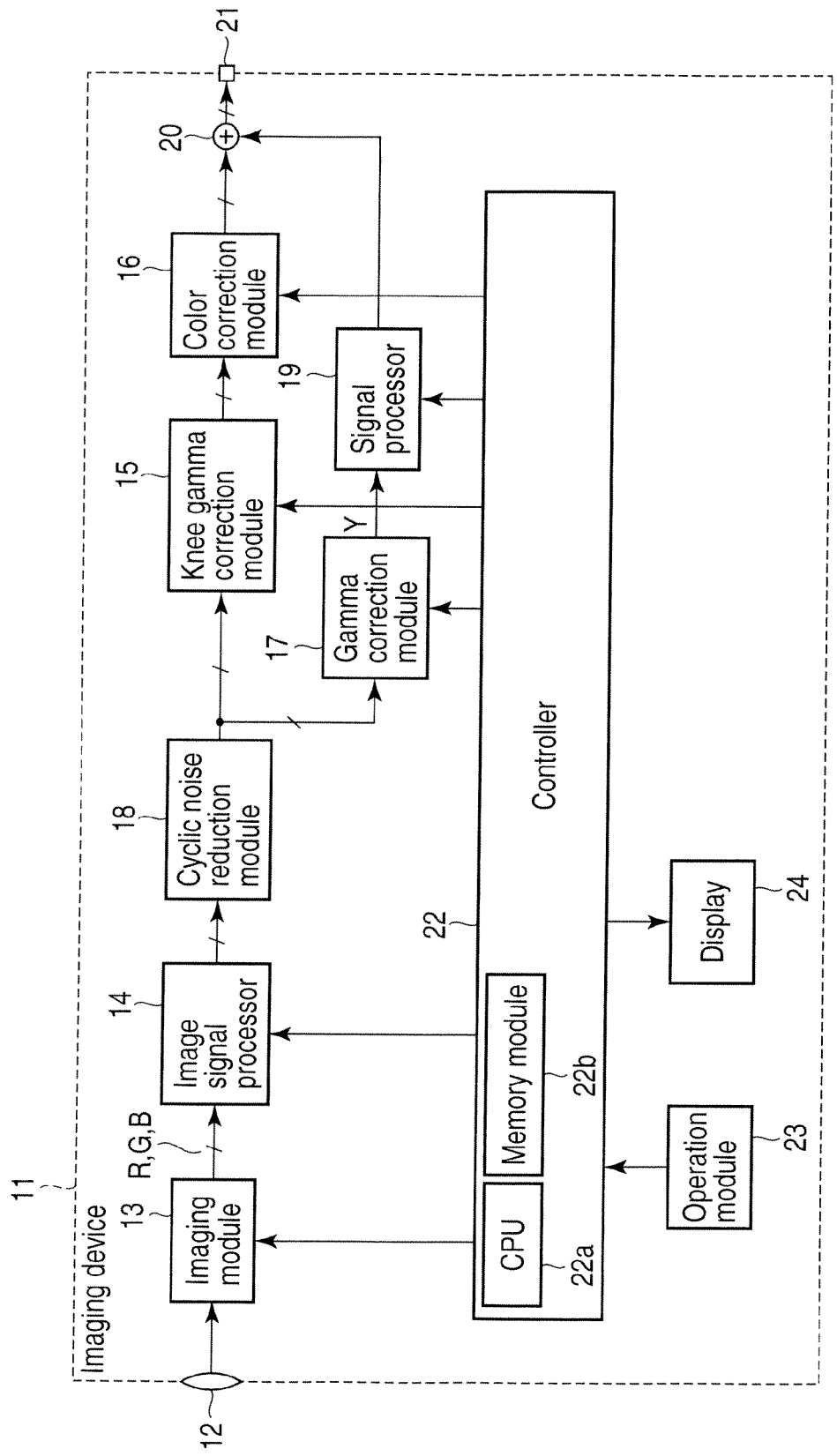
FIG. 10 is a block diagram for explaining a modification of the imaging apparatus in the embodiment.

FIG. 10 illustrates an example of a modification of the imaging device 11 illustrated in FIG. 1. In FIG. 10, the same constituent elements as those in FIG. 1 are denoted by the same respective reference numerals as those in FIG. 1. In FIG. 10, a cyclic noise reduction module 18 is arranged at a stage following an image signal processor 14, each of color signals R, G and B output from the image signal processor 14 is subjected to cyclic noise reduction processing, and the color signals R, G and B after noise reduction processing are supplied to a knee gamma correction module 15 and a gamma correction module 17.

In the imaging device 11 illustrated in FIG. 11, it is necessary to provide the cyclic noise reduction module 18 in correlation with each of the three color signals R, G and B. However, since processing performed by each of the knee gamma correction module 15, the color correction module 16, the gamma correction module 17, and a signal processor 19 is performed for the noise-reduced signals, it is possible to prevent deterioration in quality of the image signal.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A movement detection apparatus comprising:
   a detector configured to detect a level of an input image signal;
   a setting module configured to set a smoothing level range which corresponds to an amplitude level to remove a noise component overlying the input image signal, based on the level of the input image signal detected by the detector;
   an arithmetic module configured to calculate a difference signal between the input image signal and an image signal of a previous frame;
   an edge-storing filter configured to perform smoothing processing for a signal falling within the smoothing level range which is set by the setting module, among difference signals calculated by the arithmetic module; and
   a determining module configured to compare a level of a signal output from the filter with a determining level whose absolute value is higher than the smoothing level, determine the level of the signal output from the filter as a movement component when the level of the signal output from the filter is higher than the determining level, and determine the level of the signal output from the filter as a noise component when the level of the signal output from the filter is lower than the determining level.

2. The movement detection apparatus of claim 1, wherein the setting module sets a smoothing level range supplied to the filter, based on the level of the input image signal and control information which controls a characteristic of the input image signal.

3. The movement detection apparatus of claim 2, wherein the control information includes at least one of a gamma correction coefficient and a gain.

4. A noise reduction apparatus comprising:
   a detector configured to detect a level of an input image signal;
   a setting module configured to set a smoothing level range which corresponds to an amplitude level to remove a noise component overlying the input image signal, based on the level of the input image signal detected by the detector;
   a subtraction module configured to calculate a difference signal between the input image signal and an image signal of a previous frame;
   an edge-storing filter configured to perform smoothing processing for a signal falling within the smoothing level range which is set by the setting module, among difference signals calculated by the subtraction module;
   a determination module configured to compare a level of a signal output from the filter with a determining level whose absolute value is higher than the smoothing level, determine the level of the signal output from the filter as a movement component when the level of the signal output from the filter is higher than the determining level, and determine the level of the signal output from the filter as a noise component when the level of the signal output from the filter is lower than the determining level;

a generator configured to generate a cyclic coefficient corresponding to a determination result of the determination module; and an arithmetic module configured to multiply the cyclic coefficient generated by the generator by the difference signal calculated by the subtraction module, and add a multiplication result of the multiplication to the input image signal.

5. The noise reduction apparatus of claim 4, wherein the setting module sets a smoothing level range supplied to the filter, based on the level of the input image signal and control information which controls a characteristic of the input image signal.

6. The noise reduction apparatus of claim 5, wherein the control information includes at least one of a gamma correction coefficient and a gain.

7. A movement detecting method comprising:

detecting a level of an input image signal;

setting a smoothing level range which corresponds to an amplitude level to remove a noise component overlying the input image signal, based on the level of the detected input image signal;

calculating a difference signal between the input image signal and an image signal of a previous frame;

supplying the calculated difference signal to an edge-storing filter which performs smoothing processing for a signal falling within the set smoothing level range;

comparing a level of a signal output from the filter with a determining level whose absolute value is higher than the smoothing level, determining the level of the signal output from the filter as a movement component when the level of the signal output from the filter is higher than the determining level, and determining the level of the signal output from the filter as a noise component when the level of the signal output from the filter is lower than the determining level.

8. The movement detecting method of claim 7, wherein the smoothing level range supplied to the filter is set based on the level of the input image signal and control information which controls a characteristic of the input image signal.

9. The movement detecting method of claim 8, wherein the control information includes at least one of a gamma correction coefficient and a gain.

* * * * *